(12) United States Patent  
Zhou et al.

(10) Patent No.: US 11,323,149 B2  
(45) Date of Patent: May 3, 2022

(54) RECEIVER FEEDBACK OF REPETITION CONFIGURATION

(71) Applicant: QUALCOMM Incorporated, San Diego, CA (US)

(72) Inventors: Yan Zhou, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 137 days.

(21) Appl. No.: 16/200,527

(22) Filed: Nov. 26, 2018

(65) Prior Publication Data

US 2019/0165831 A1 May 30, 2019

Related U.S. Application Data

(60) Provisional application No. 62/590,998, filed on Nov. 27, 2017.

(51) Int. Cl.
*H04B 1/7143* (2011.01)
*H04B 1/713* (2011.01)
(Continued)

(52) U.S. Cl.
CPC ........... *H04B 1/7143* (2013.01); *H04B 1/713* (2013.01); *H04B 7/0408* (2013.01); *H04B 7/063* (2013.01);
(Continued)

(58) Field of Classification Search
CPC .... H04B 1/7143; H04B 1/713; H04B 7/0408; H04B 7/0617; H04B 7/063; H04L 1/0023; H04L 1/08; H04L 5/001
See application file for complete search history.

(56) References Cited

U.S. PATENT DOCUMENTS

2015/0004918 A1* 1/2015 Wang .................... H04W 40/12  
455/73  
2015/0289147 A1* 10/2015 Lou ...................... H04B 7/0417  
370/329  
(Continued)

OTHER PUBLICATIONS

CMCC: "Discussion on Coverage Enhancement Transmission of PDCCH," 3GPP Draft; R1-1717887, 3rd Generation Partnership Project (3GPP), Mobile Competence Centre; 650, Route Des Lucioles; F-06921 Sophia-Antipolis Cedex; France, vol. RAN WG1, No. Prague, CZ; Oct. 9, 2017-Oct. 13, 2017, Oct. 8, 2017, XP051341071, 3 pages, Retrieved from the Internet: URL: http://www.3gpp.org/ftp/Meetings_3GPP_SYNC/RAN1/Docs/ [retrieved on Oct. 8, 2017].

(Continued)

*Primary Examiner* — Jenee Holland
(74) *Attorney, Agent, or Firm* — Procopio, Cory, Hargreaves & Savitch LLP

(57) ABSTRACT

A method, a computer-readable medium, and an apparatus are provided for wireless communication comprising repetitions that provide a solution to the problem of identifying and refining a repetition configuration at a transmitter. A transmitter receives repetition configuration information from a receiver and transmits repetitions of a signal to the receiver based on the received repetition configuration information. The repetition configuration information comprises an indication of at least one of a repetition frequency hopping indicator, at least one beam index, a repetition type or whether repetition is enabled.

30 Claims, 16 Drawing Sheets

(51) Int. Cl.
   *H04B 7/0408*    (2017.01)
   *H04B 7/06*      (2006.01)
   *H04L 1/00*      (2006.01)
   *H04L 1/08*      (2006.01)
   *H04L 5/00*      (2006.01)

(52) U.S. Cl.
   CPC ......... *H04B 7/0617* (2013.01); *H04L 1/0023* (2013.01); *H04L 1/08* (2013.01); *H04L 5/001* (2013.01)

(56) References Cited

U.S. PATENT DOCUMENTS

2016/0330698 A1* 11/2016 Loehr .................. H04W 72/04
2016/0337085 A1* 11/2016 Yu ....................... H04W 40/02
2017/0265187 A1    9/2017 Chen et al.

OTHER PUBLICATIONS

International Search Report and Written Opinion—PCT/US2018/062644—ISA/EPO—dated Feb. 27, 2019.
ZTE: "Physical Random Access Channel Coverage Enhancement", 3GPP Draft, R1-134303—Physical Random Access Channel Coverage Enhancement, 3rd Generation Partnership Project (3GPP), Mobile Competence Centre, 650, Route Des Lucioles, F-06921 Sophia-Antipolis, CED, vol. RAN WG1, No. Guangzhou, China, Oct. 7, 2013-Oct. 11, 2013, Sep. 28, 2013 (Sep. 28, 2013), XP050717447, 16 Pages, Retrieved from the Internet: URL: http://www.3gpp.org/ftp/tsg_ran/WG1_RL1/TSGR1_74b/Docs/ [retrieved on Sep. 28, 2013] the whole document.

* cited by examiner

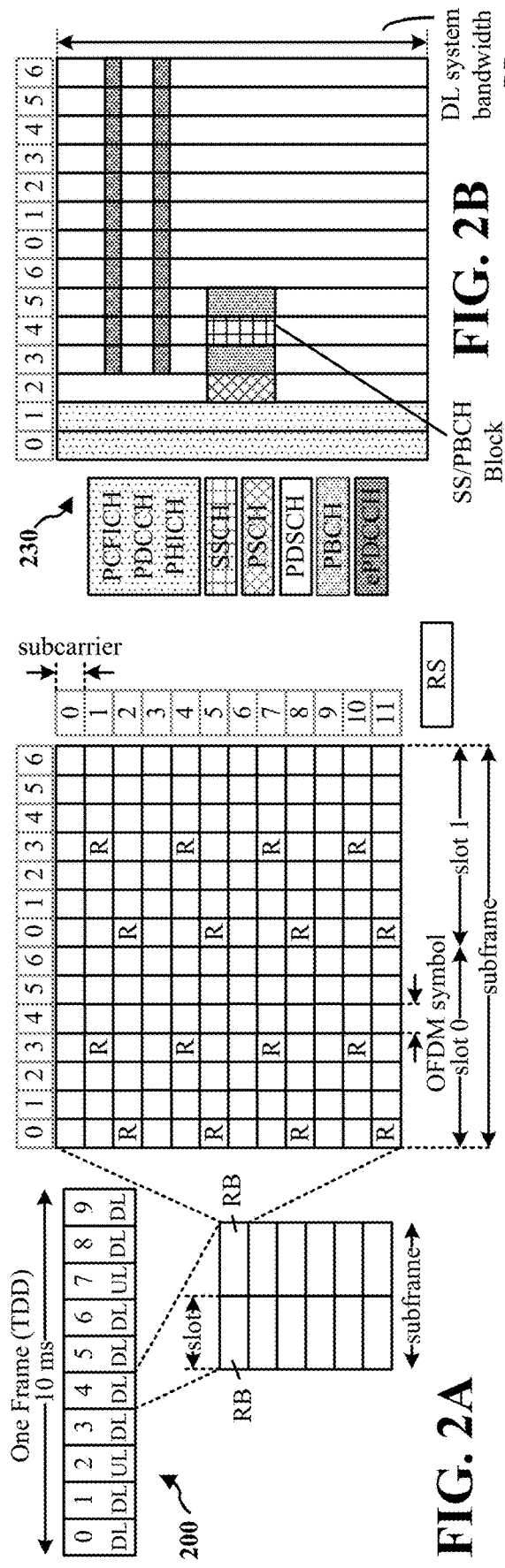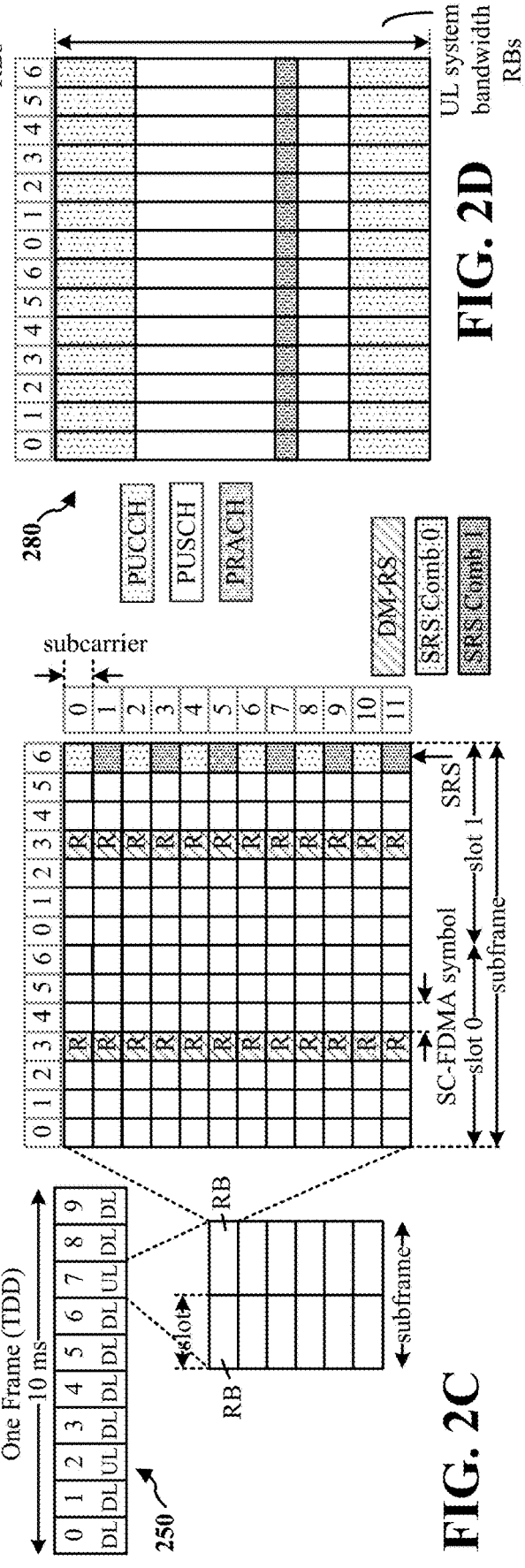

RECEIVER FEEDBACK OF REPETITION CONFIGURATION

CROSS-REFERENCE TO RELATED APPLICATION

This application claims the benefit of U.S. Provisional Application Ser. No. 62/590,998, entitled "Receiver Feedback of Repetition Configuration" and filed on Nov. 27, 2017, which is expressly incorporated by reference herein in its entirety.

BACKGROUND

Technical Field

The present disclosure relates generally to communication systems, and more particularly, to wireless communication comprising repetitions.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Repetitions may be used for range extension of a particular signal, e.g., in mmWave (mmW) wireless communication. For example, a mmW control channel or mmW shared channel may employ repetitions of a signal. It may be difficult for a transmitter to quickly and accurately determine the best repetition configuration for the transmissions. The transmitter may require learning time to refine a repetition configuration, and a particular repetition configuration might not be beneficial for all receivers communicating with the transmitter.

Aspects presented herein provide a solution to the problem of identifying and refining a repetition configuration at a transmitter through a receiver providing feedback of repetition configuration to a transmitter. The transmitter may then use the repetition configuration information received from the receiver in transmitting repetitions to that receiver.

In an aspect of the disclosure, a method, a computer-readable medium, and an apparatus are provided for wireless communication at a transmitter. The apparatus receives repetition configuration information from a receiver, wherein the repetition configuration information comprises an indication of at least one of a repetition frequency hopping indicator, at least one beam index, a repetition type or whether repetition is enabled. Then, the apparatus transmits repetitions of a signal to the receiver based on the received repetition configuration information In an aspect of the disclosure, a method, a computer-readable medium, and an apparatus are provided for wireless communication at a receiver. The apparatus transmits repetition configuration information to a transmitter, wherein the repetition configuration information comprises an indication of at least one of a repetition frequency hopping indicator, at least one beam index, a repetition type, or whether repetition is enabled. Then, the apparatus receives repetitions of a signal from the transmitter based on the transmitted repetition configuration information.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 2A, 2B, 2C, and 2D are diagrams illustrating examples of a DL subframe, DL channels within the DL subframe, an UL subframe, and UL channels within the UL subframe, respectively, for a 5G/NR frame structure.

DETAILED DESCRIPTION

Figure 1:
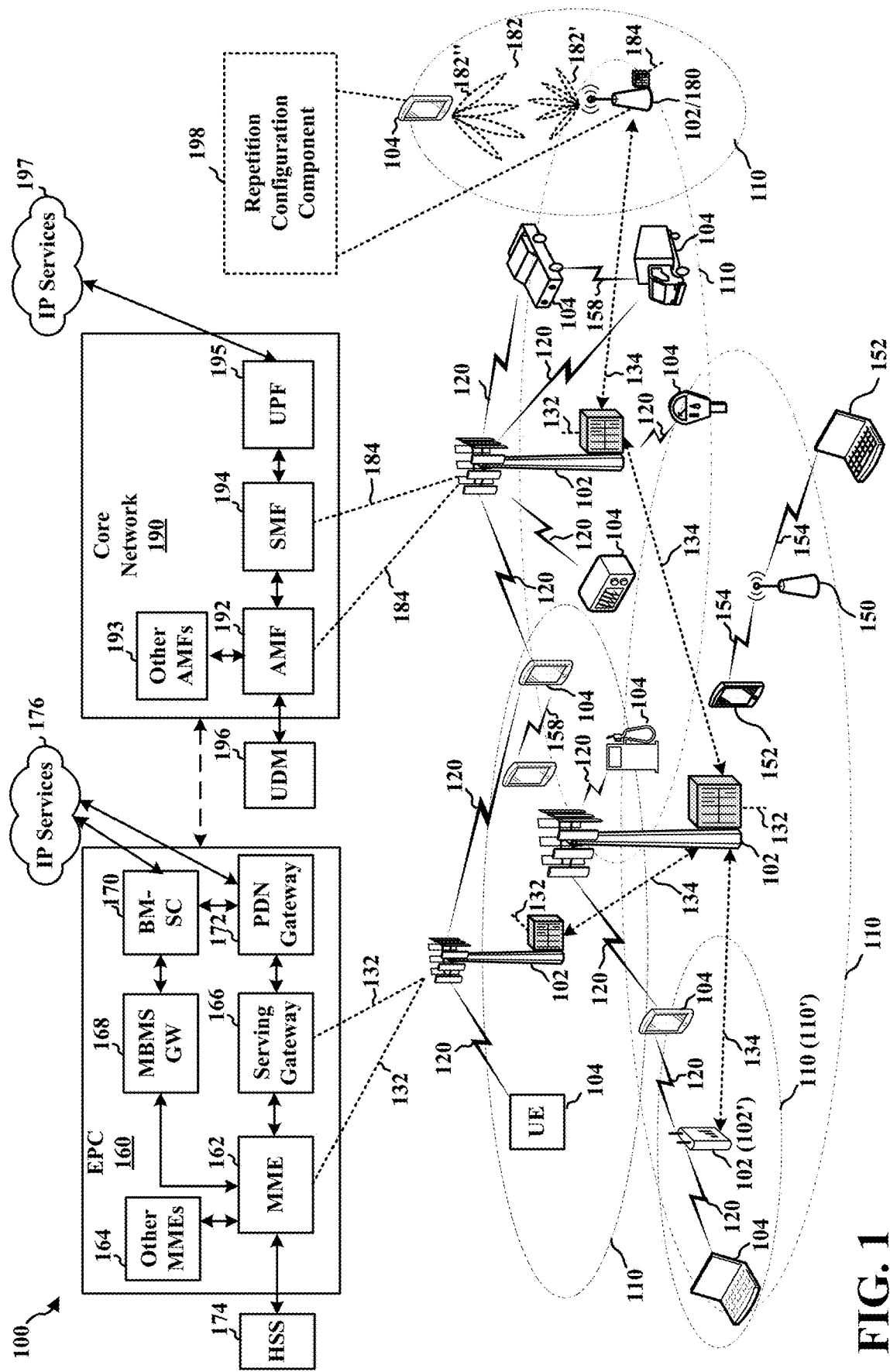
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G core network 5GC). The base stations 102 may include macro cells (high power cellular base station) and/or small cells (low power cellular base station). The macro cells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., S1 interface). The base stations 102 configured for 5G NR (collectively referred to as Next Generation RAN (NG-RAN)) may interface with core network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or other type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 182 with the UE 104 to compensate for the extremely high path loss and short range.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104/base station 180 may be configured to provide feedback comprising repetition configuration information and to receive such feedback via a repetition configuration component 198, as described in connection with FIGS. 5-12.

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu 0$ to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2\mu$ slots/subframe. The subcarrier spacing and symbol length/duration are a function of the numerology. The subcarrier spacing may be equal to $2^{\mu}*15$ kKz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 2A-2D provide an example of slot configuration 0 with 14 symbols per slot and numerology $\mu=0$ with 1 slot per subframe. The subcarrier spacing is 15 kHz and symbol duration is approximately 66.7 $\mu$s.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
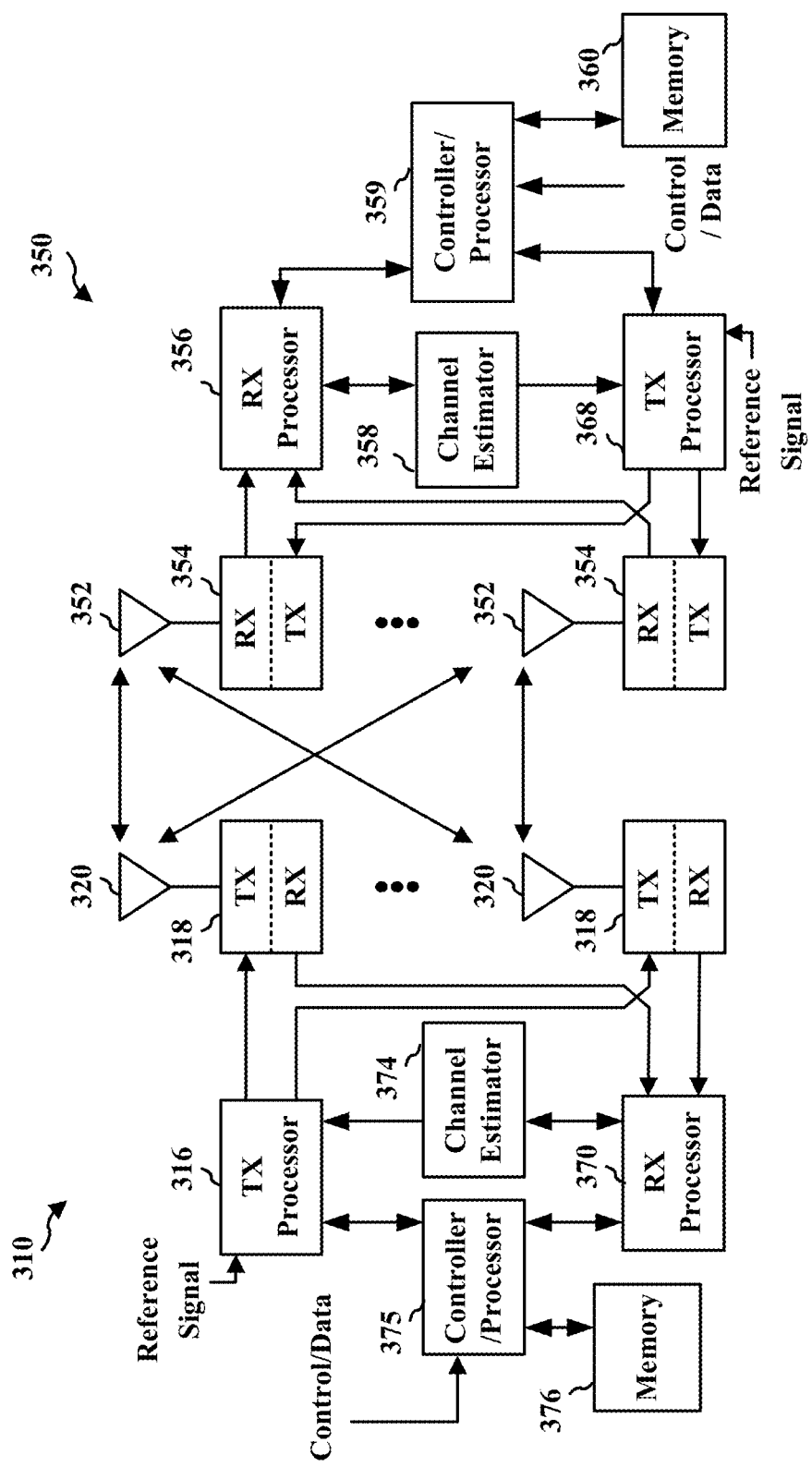
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

Figure 4:
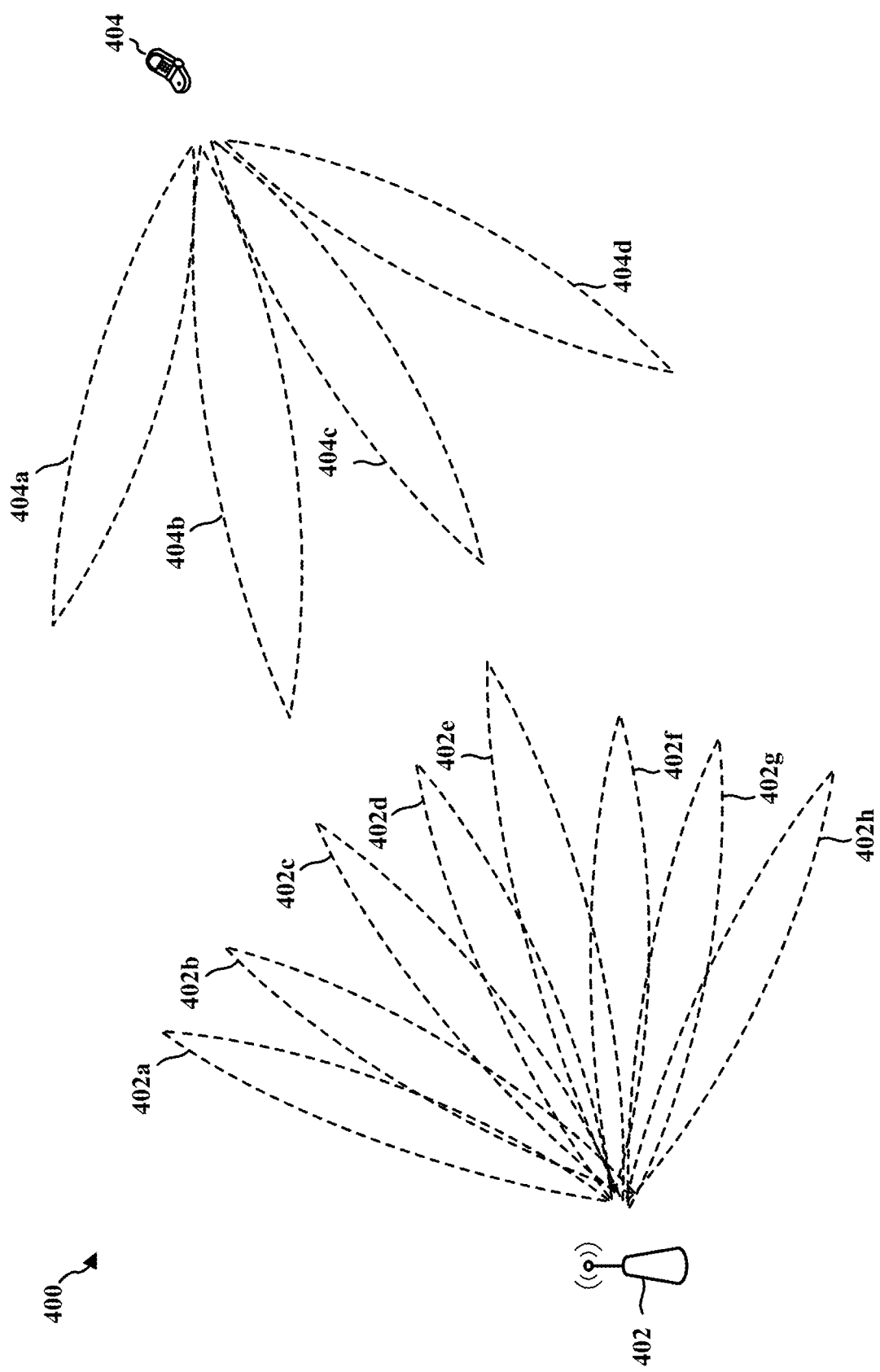
FIG. 4 is a diagram illustrating a base station in communication with a UE.

FIG. 4 is a diagram 400 illustrating a base station 402 in communication with a UE 404. Referring to FIG. 4, the base station 402 may transmit a beamformed signal to the UE 404 in one or more of the directions 402a, 402b, 402c, 402d, 402e, 402f, 402g, 402h. The UE 404 may receive the beamformed signal from the base station 402 in one or more receive directions 404a, 404b, 404c, 404d. The UE 404 may also transmit a beamformed signal to the base station 402 in one or more of the directions 404a-404d. The base station 402 may receive the beamformed signal from the UE 404 in one or more of the receive directions 402a-402h. The base station 402/UE 404 may perform beam training to determine the best receive and transmit directions for each of the base station 402/UE 404. The transmit and receive directions for the base station 402 may or may not be the same. The transmit and receive directions for the UE 404 may or may not be the same.

Repetitions may be used for range extension of a particular signal, e.g., in mmW wireless communication. The original signal may be transmitted, and at least one repetition of the signal may be transmitted. For example, a mmW control channel (e.g., PDCCH) or mmW shared channel (e.g., PDSCH) may employ repetitions of a signal. The signal may be for traffic data or for Other System Information (OSI). It may be difficult for a transmitter to quickly and accurately determine the best repetition configuration for the transmissions.

While a transmitter may refine a repetition configuration based on Block Error Rate (BLER), such refinement may require an undesirable amount of learning time for the transmitter. A transmitter may refine repetition configurations based on an SINR report from a receiver. However, for a given SINR, the required number of repetitions may differ among different UEs. For example, different UEs may have different decoding performance and sensitivity. Therefore, the SINR reports provide limited help to the transmitter in determining repetition configurations. As well, CSI feedback from receivers might not capture any feedback regarding repetition configuration that would be helpful to a transmitter.

Figure 5:
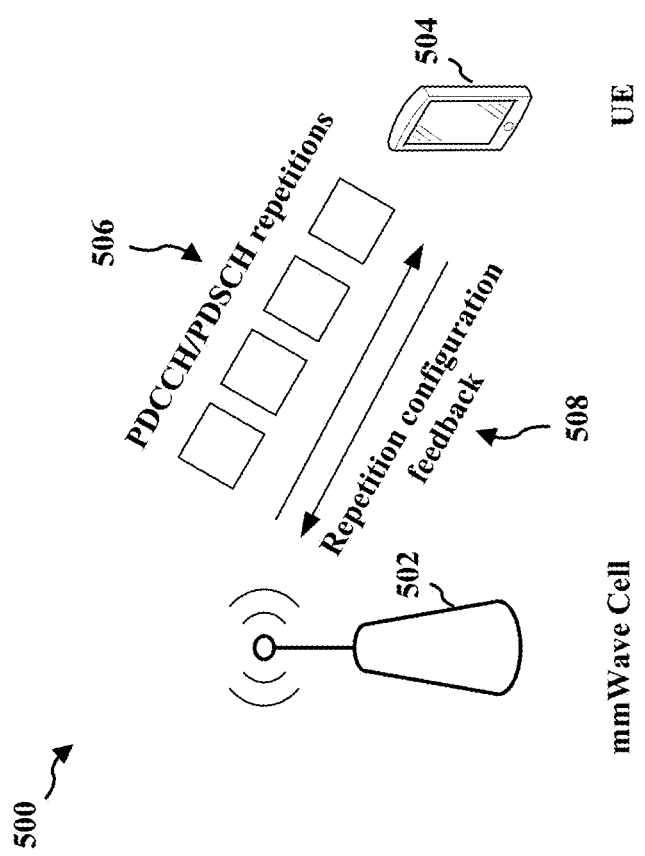
FIG. 5 is a diagram illustrating a transmitter in communication employing repetitions with a receiver.

Aspects presented herein provide a solution to the problem of identifying and refining a repetition configuration at a transmitter through a receiver providing feedback regarding a repetition configuration to a transmitter. The transmitter may then use the repetition configuration information received from the receiver in transmitting repetitions to that receiver. FIG. 5 illustrates an example communication system 500 comprising a base station 502 communicating with a UE 504. As illustrated, the base station may transmit repetitions 506 to UE 504. The UE 504 may provide repetition configuration information 508 to the base station to enable the base station to determine/refine a repetition configuration for communicating with the UE. The provision of feedback with repetition configuration information from the receiver enables the base station to make more effective repetition configurations, thereby improving communication between the transmitter and receiver. Although this example is illustrated for a UE providing repetition configuration feedback to a base station, the concept may be applied to any transmitter and receiver. In other examples, the UE may be the transmitter, and the base station may be the receiver providing repetition configuration information to the base station.

The feedback with repetition configuration information 508 may serve as an extension of CSI/CQI feedback. The repetition configuration information may include various types of information, e.g., including any of a repetition number, a repetition pattern in time/frequency, transmission/reception beam indices, an indication of which signal channel the information applies, etc.

Figure 6:
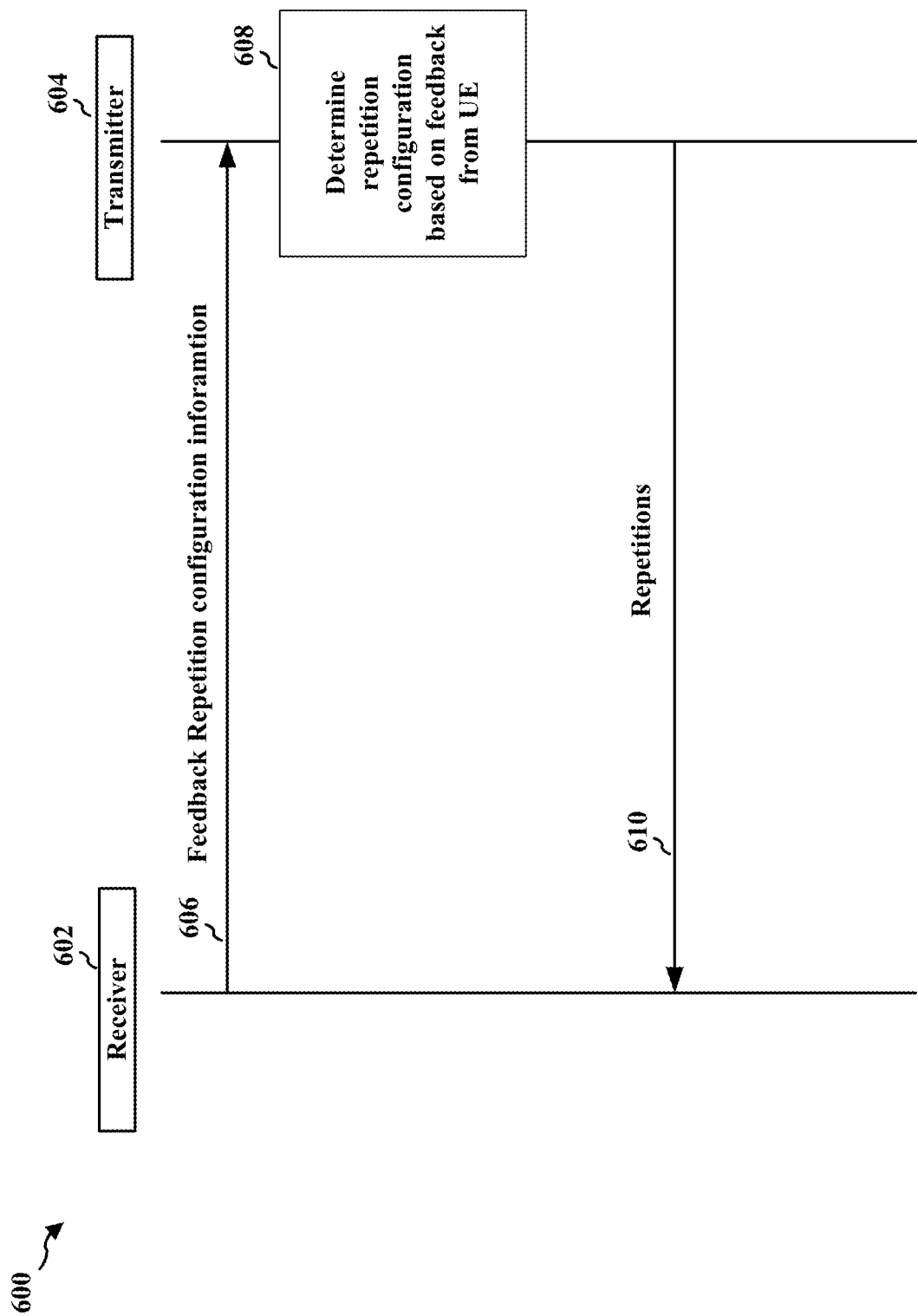
FIG. 6 is a communication flow between a transmitter and a receiver.

FIG. 6 illustrates an example communication flow 600 between a receiver 602 and a transmitter 604. The receiver may determine feedback regarding repetition configuration information and may provide the feedback comprising the repetition configuration information to the transmitter at 606. At 608, the transmitter may use the received feedback to determine a repetition configuration for the transmissions to the receiver. Then, at 610, the transmitter may transmit repetitions in accordance with the configuration determined at 608, as illustrated in FIG. 5.

The repetition configuration information may be received on a feedback link and the repetitions of the signal are transmitted on a serving link, e.g., as illustrated in the example of FIG. 5. The feedback link may be different than the serving link. The serving link and feedback link may have the same frequency band or may use different frequency bands. For example, the serving link may comprise a mmW link, while the feedback link comprises a sub-6 GHz link. The feedback link may be relayed from the receiver to the transmitter via another node in the middle between the transmitter and the receiver, whereas the serving link may be directly from the transmitter to the receiver. For example, a UE may send feedback to a macrocell on sub-6 GHz, which relays the feedback to a network node, which further relays the feedback to a mmW cell that is transmitting to the UE. The feedback link may comprise a wireless link. In another example, the feedback link may comprise both a wired connection and a wireless connection.

The repetition configuration information may indicate to the transmitter whether to enable or disable repetitions.

The repetition configuration information may comprise a number of repetitions. Then, the transmitter may determine a number of repetitions of the signal to transmit to the receiver based on the number indicated in the repetition configuration information. For example, the transmitter may send the indicated number of repetitions when transmitting to the UE.

Figures 7A, 7B:
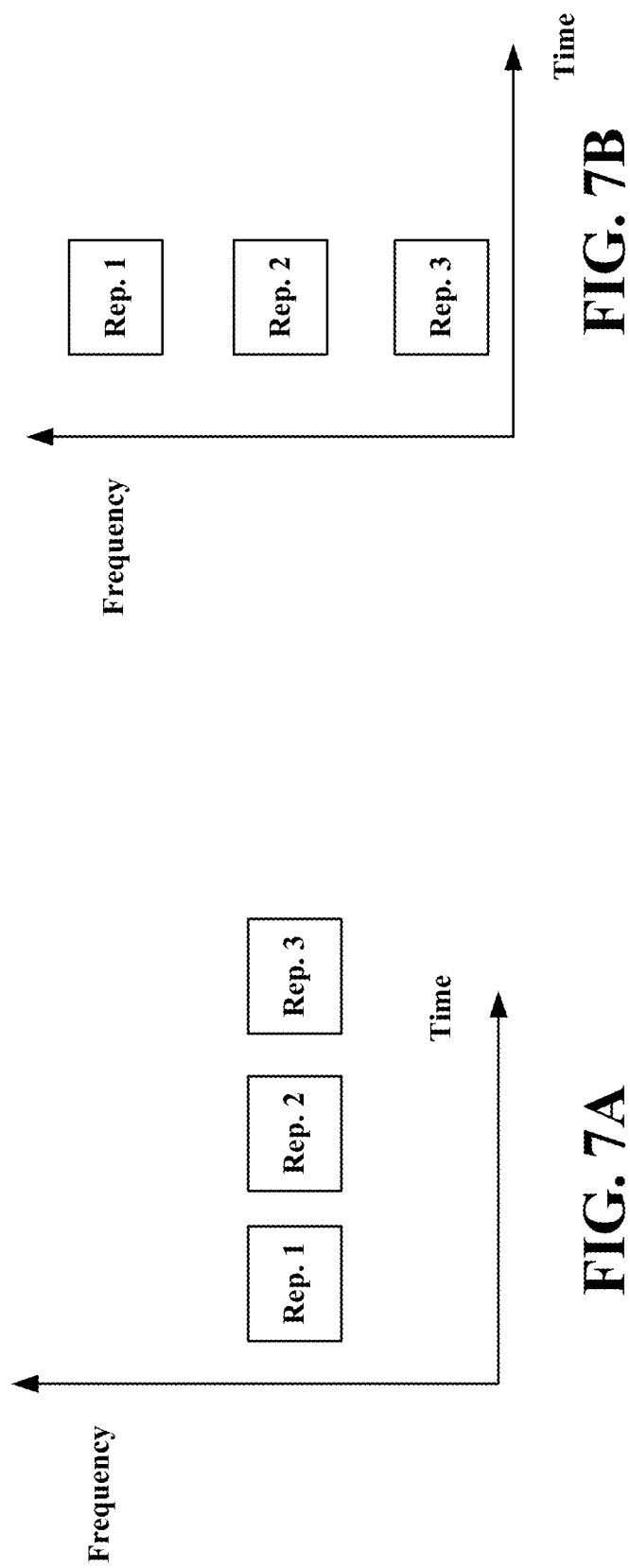
FIG. 7A illustrates a repetition pattern in time.
FIG. 7B illustrates a repetition pattern in frequency.

The repetition configuration information may comprise information regarding a repetition pattern. This information may enable the transmitter to determine the time/frequency location per repetition for the transmission. The repetition pattern may be based on time, e.g., for a band limited receiver. FIG. 7A illustrates an example repetition pattern based on time. In another example the repetition pattern may be based on frequency, e.g., for a wideband receiver to improve decoding latency. FIG. 7B illustrates an example pattern based on frequency.

Figure 8:
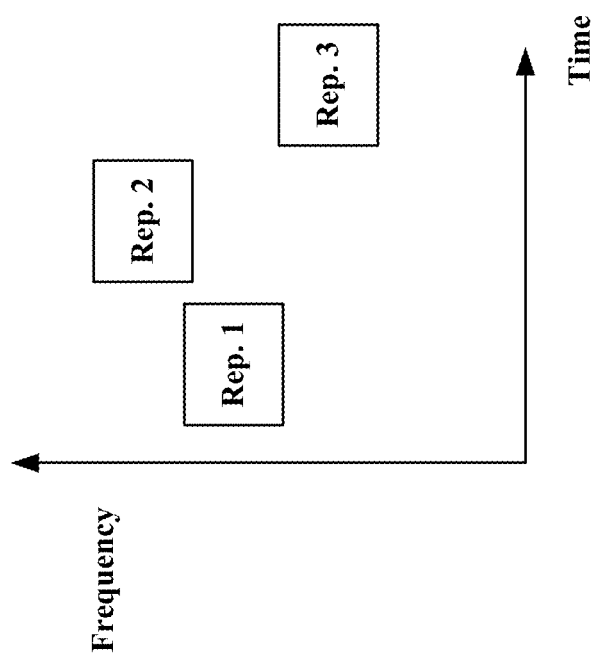
FIG. 8 illustrates a repetition pattern employing frequency hopping.

The repetition configuration information provided as feedback from the receiver to the transmitter may comprise a repetition frequency hopping indicator. This indicator may enable the transmitter to determine whether to employ a frequency hopping pattern across repetitions when transmitting the repetitions. FIG. 8 illustrates an example frequency hopping pattern 800 in which the first, second, and third repetition are transmitted both at different times and at different frequencies. Thus, after a first repetition is transmitted at a first frequency, the transmitter may hop to a second frequency for transmission of the second repetition and hop to a third frequency to transmit the third repetition.

Figure 9:
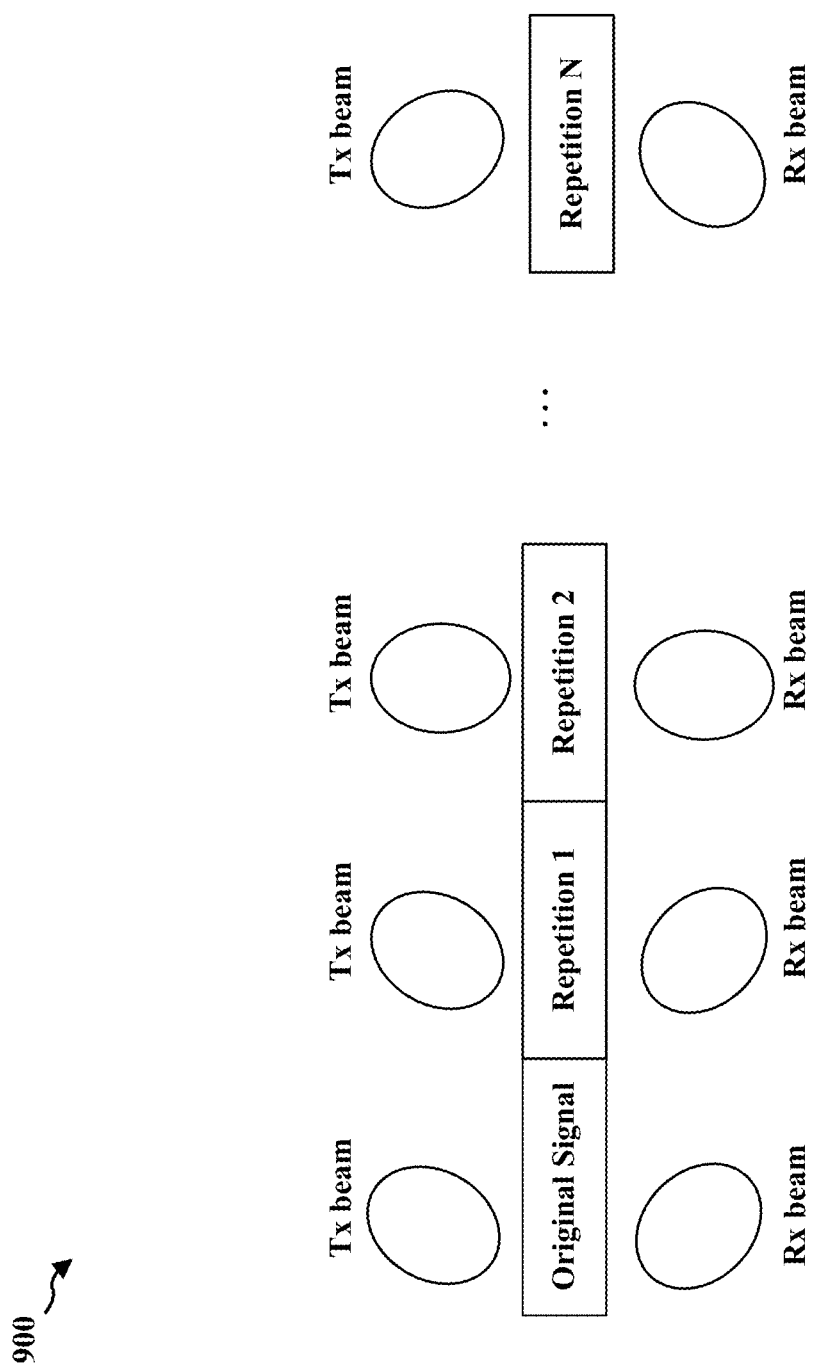
FIG. 9 illustrates a sequence of beam indices for a sequence of repetition beams.

The repetition configuration information provided in feedback from a receiver to a transmitter may include a sequence of beam indices for a sequence of transmission beams, or other beam index information. The transmitter may then transmit the repetitions of the signal to the receiver using the sequence of transmission beams selected based on the repetition configuration information. Similarly, the repetition configuration information may include a sequence of beam indices for a sequence of reception beams. The receiver may receive the repetition transmitted from the transmitter using the sequence of reception beams based on the sequence of reception beams provided in the repetition configuration information. Thus, the transmitter may determine which beam pair to use per repetition based on the repetition configuration information received as feedback from the receiver. FIG. 9 illustrates an example sequence 900 of transmission beams and reception beams for repetitions. As illustrated in FIG. 9, the sequence may involve a first transmission beam and/or a first reception beam followed by different beams used for repetitions of the original signal. In FIG. 9, the repetition may be transmitted/received using the same reception beam/transmission beam as the original signal. FIG. 9 illustrates a different reception beam/ different transmission beam being used for the second repetition of the original signal. The beams may continue to change for various repetitions, e.g., up to the last of N repetitions (e.g., repetition N).

Figure 10:
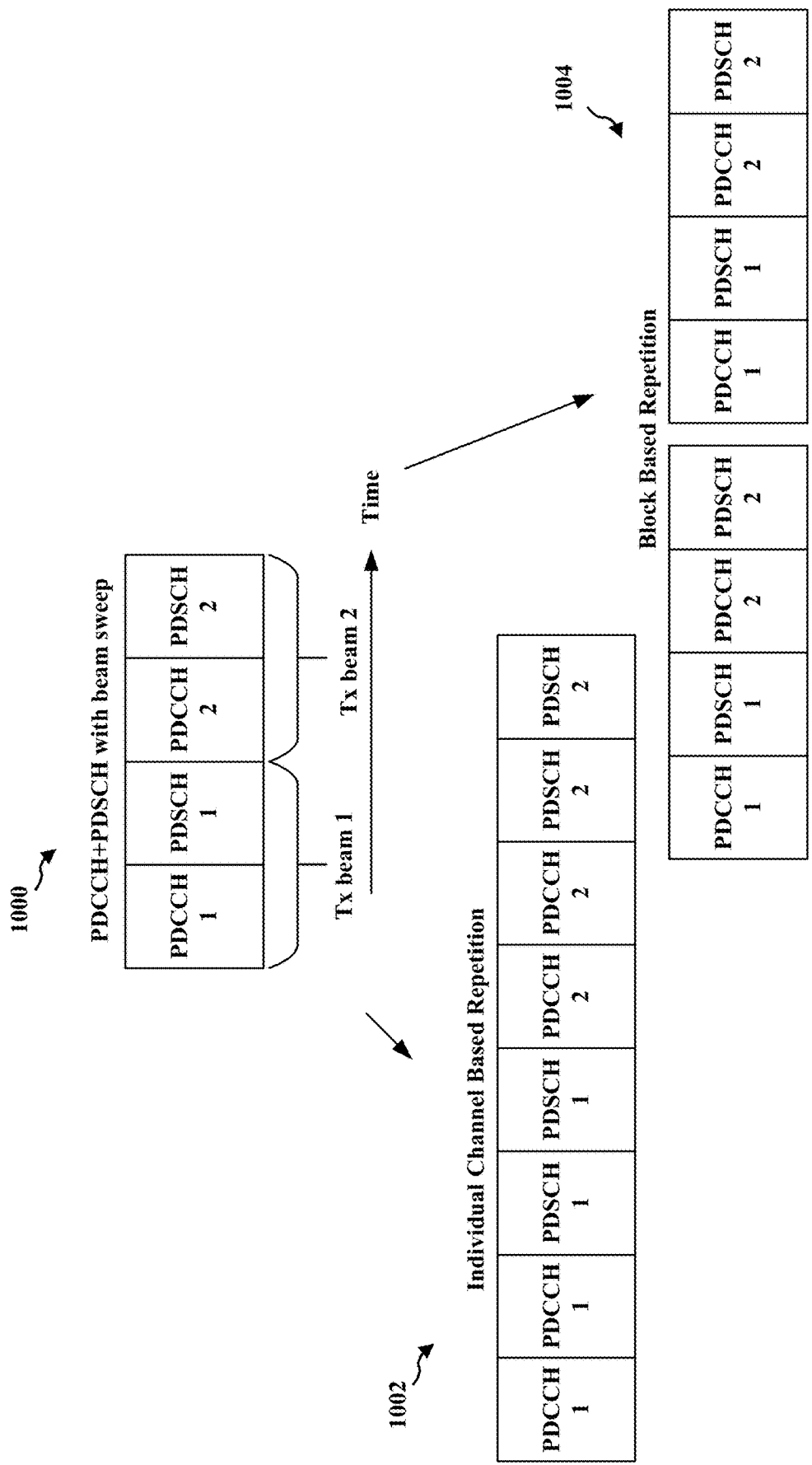
FIG. 10 illustrates two example repetition types.

The repetition configuration information may indicate a repetition type. FIG. 10 illustrates two example repetition types for a control channel and a shared channel with a beam sweep. As illustrated, the repetition types include a channel-based repetition and a block-based repetition. An example beam sweep block 1000 is illustrated that includes a PDCCH1 and PDSCH1 transmitted using a first transmission beam. Then, a PDCCH2 and PDSCH2 are transmitted using a second transmission beam.

In an individual channel-based repetition type 1002, each channel is individually repeated per transmission beam in adjacent symbols. As illustrated PDCCH1 (PDCCH transmitted using transmission beam 1) is transmitted and repeated in an adjacent symbol before PDSCH1 (PDSCH transmitted using transmission beam 1) is transmitted. Similarly, PDSCH1 (PDSCH transmitted using transmission beam 1) is transmitted and repeated in an adjacent symbol before the beam sweep moves to transmission beam 2. Then, PDCCH2 (PDCCH transmitted using transmission beam 2) is transmitted and repeated in an adjacent symbol before PDSCH2.

In a block-based repetition example 1004, the whole beam sweep block 1000 is transmitted (e.g., PDCCH 1, PDSCH 1, PDCCH 2, PDSCH 2) as the original transmission. Then, the whole beam sweep block is repeated.

Thus, the repetition configuration information provided by the receiver to the transmitter may indicate whether the repetition should be an individual channel-based repetition or a beam sweep block-based repetition, e.g., when the repetitions will be transmitted using a beam sweep.

Figure 11:
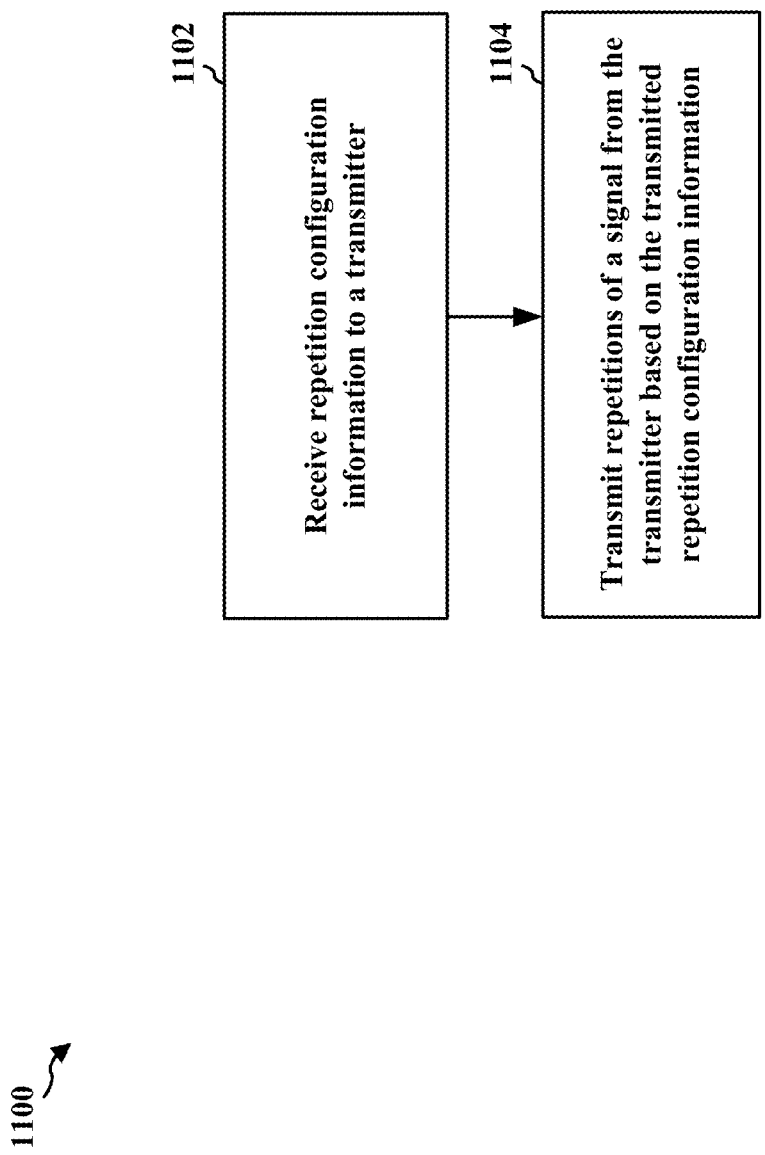
FIG. 11 is a flowchart of a method of wireless communication.

FIG. 11 is a flowchart 1100 of a method of wireless communication. The method may be performed by a transmitter (e.g., transmitter 1550, the apparatus 1302, 1302'). The transmitter may be a UE or a base station (e.g., UE 104, 350, 404, 504, 602 communicating as a transmitter or base station 102, 310, 402, 502, 604 communicating as a transmitter). At 1102, the transmitter receives repetition configuration information from a receiver. At 1104, the transmitter transmits repetitions of a signal to the receiver based on the received repetition configuration information.

The repetition configuration information may indicate a number of repetitions, wherein the transmitter determines a number of repetitions of the signal to transmit to the receiver based on the repetition configuration information.

The repetition configuration information may indicate a repetition pattern, wherein the repetition pattern is based on at least one of time and frequency. FIGS. 7A and 7B illustrate example patterns in time and frequency.

The repetition configuration information may indicate a repetition frequency hopping indicator, wherein the transmitter determines whether to enable frequency hopping for the repetitions of the signal to the receiver, e.g., as in the example illustrated in FIG. 8, based on the repetition configuration information. For example, the repetition configuration may indicate repetition frequency hopping, at 1102, and the transmitter may transmit the repetitions of the signal, at 1104, comprising frequency hopping for the repetitions of the signal to the receiver based on the repetition configuration information.

The repetition configuration information may indicate at least one beam index. The at least one beam index may comprise a sequence of beam indices for at least a sequence of transmission beams, wherein the transmitter transmits the repetitions of the signal to the receiver comprising using the sequence of transmission beams. The sequence of transmission beams may be selected based on the repetition configuration information, as described in connection with FIG. 9. Similarly, the repetition configuration information may comprise at least a sequence of beam indices for at least a sequence of reception beams to enable the receiver to receive the repetition transmitted from the transmitter using the sequence of reception beams, e.g., selected based on the repetition configuration information.

The repetition configuration information may indicate at least one beam index for a transmission and/or a reception beam, wherein the transmitter transmits the repetitions of the signal to the receiver using the indicated transmission beam or in a manner to be received using the indicated reception beam.

The repetition configuration information may comprise an indicator corresponding to whether repetitions should be enabled or disabled. The transmitter may transmit the repetitions of the signal to the receiver when the indicator indicates that repetitions should be enabled and may refrain from transmitting repetitions when the indicator indicates that repetitions should be disabled.

The repetition configuration information may correspond to a particular signal channel, e.g., PDCCH, PDSCH, PBCH, PUCCH, PUSCH, etc., and may include an indication of the particular channel to which the repetition configuration information pertains. The receiver may provide different repetition configuration for different channels.

The repetition configuration information may include repetition configuration information for a plurality of signal channels and an indication that indicates to which of the respective plurality of signal channels corresponding repetition configuration information should be applied. Thus, different configuration information may be applicable to different channels/types of transmissions. The indication may enable the transmitter to determine the repetition configuration information applicable to a particular channel.

The repetition configuration information may comprise a repetition type, e.g., the repetition type may comprise a beam sweep repetition type for repetitions of a control channel and/or a shared channel, as illustrated in the example of FIG. 10. The repetition type may indicate an individual channel-based beam sweep repetition or a beam sweep block-based repetition, as illustrated in the example of FIG. 10.

The repetition configuration information may indicate whether the repetition configuration information is mandatory for the transmitter to use to transmit the signal to the receiver. Thus, the indicator may enable the transmitter to determine whether the repetition configuration information is mandatory or a recommendation.

The repetition configuration information may comprise any combination of the examples provided herein. For example, the transmitter may receive, at 1102, repetition configuration information that comprises any combination of a repetition frequency hopping indicator, at least one beam index, a repetition type, a repetition number, a repetition pattern, an indication of whether repetition is enabled/disabled, whether use of the repetition configuration information is mandatory, etc.

The repetition configuration information may be received on a feedback link and the repetitions of the signal are transmitted on a serving link, e.g., as illustrated in the example of FIG. 5. The feedback link may be different than the serving link. The feedback link may be relayed from the receiver to the transmitter via another node. The feedback link may comprise both a wired connection and a wireless connection.

Figure 12:
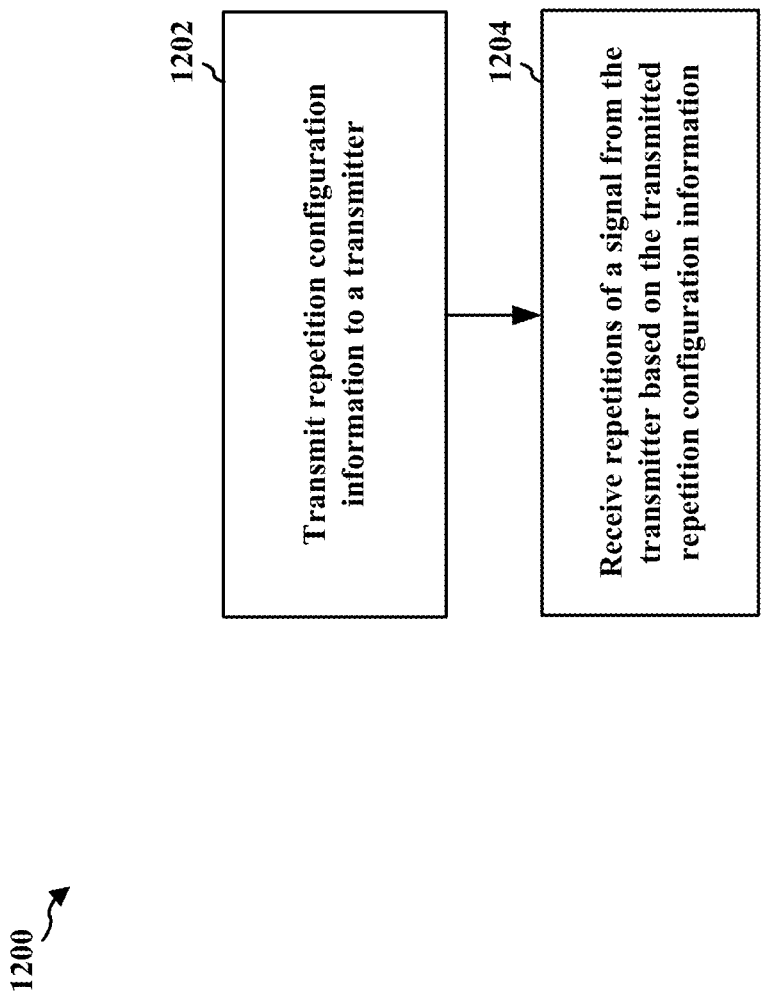
FIG. 12 is a flowchart of a method of wireless communication.

FIG. 12 is a flowchart 1200 of a method of wireless communication. The method may be performed by a receiver (e.g., 1350, the apparatus 1502, 1502'). The transmitter may be a UE or a base station (e.g., UE 104, 350, 404, 504, 602 communicating as a receiver or base station 102, 310, 402, 502, 604 communicating as a receiver). At 1202, the receiver transmits repetition configuration information to a transmitter.

At 1204, the receiver receives repetitions of a signal from the transmitter based on the transmitted repetition configuration information.

The repetition configuration information may comprise a number of repetitions, wherein a number of repetitions of the signal received from the transmitter is based on the repetition configuration information.

The repetition configuration information may comprise a repetition pattern, wherein the repetition pattern is based on at least one of time and frequency. FIGS. 7A and 7B illustrate example patterns in time and frequency.

The repetition configuration information may comprise a repetition frequency hopping indicator, and the repetitions of the signal may be received from the transmitter in a frequency hopping pattern across repetitions when the repetition frequency hopping indicator indicates frequency hopping across repetitions is enabled.

The repetition configuration information may comprise at least one beam index. The at least one beam index may comprise a sequence of beam indices for at least a sequence of transmission beams, wherein the transmitter transmits the repetitions of the signal to the receiver using the sequence of transmission beams selected based on the repetition configuration information, as described in connection with FIG. 9. Thus, the receiver may receive the repetitions of the signal from the transmitter via the sequence of the transmission beams. Similarly, the repetition configuration information may comprise at least a sequence of beam indices for at least a sequence of reception beams, wherein the receiver receives the repetition transmitted from the transmitter using the sequence of reception beams selected based on the repetition configuration information.

The repetition configuration information may comprise at least one beam index for at least a transmission or a reception beam. The transmitter may transmit the repetitions of the signal to the receiver using the indicated transmission beam. Thus, the receiver may receive the transmission using the information about the transmission beam. Similarly, the receiver may receive the transmission using the indicated reception beam.

The repetition configuration information may comprise an indicator corresponding to whether repetitions should be enabled or disabled. Then, the receiver may receive the repetitions of the signal to the receiver when the indicator indicates that repetitions should be enabled. The transmitter may refrain from transmitting repetitions when the indicator indicates that repetitions should be disabled. Thus, the receiver may receive the transmission without repetitions when the repetition configuration information indicates that repetitions are disabled.

The repetition configuration information may correspond to a particular signal channel, e.g., PDCCH, PDSCH, PBCH, PUCCH, PUSCH, etc., and may include an indication of the particular channel to which the repetition configuration information pertains.

The repetition configuration information may include repetition configuration information for a plurality of signal channels and an indication that indicates to which of the respective plurality of signal channels corresponding repetition configuration information should be applied. Thus, different configuration information may be applicable to different channels/types of transmissions. The indication may enable the transmitter to determine the repetition configuration information applicable to a particular channel.

The repetition configuration information may comprise a repetition type, e.g., the repetition type may comprise a beam sweep repetition type for repetitions of a control channel and/or a shared channel, as illustrated in the example of FIG. 10. The repetition type may indicate an individual channel-based beam sweep repetition or a beam sweep block-based repetition, as illustrated in the example of FIG. 10.

The repetition configuration information may comprise an indicator that indicates whether the repetition configuration information is mandatory for the transmitter to use to transmit the signal to the receiver. Thus, the indicator may enable the transmitter to determine whether the repetition configuration information is mandatory or a recommendation.

The repetition configuration information may comprise any combination of the examples provided herein. For example, the receiver may transmit, at 1202, repetition configuration information that comprises any combination of a repetition frequency hopping indicator, at least one beam index, a repetition type, a repetition number, a repetition pattern, an indication of whether repetition is enabled/disabled, whether use of the repetition configuration information is mandatory, etc.

The repetition configuration information may be received on a feedback link and the repetitions of the signal are transmitted on a serving link, e.g., as illustrated in the example of FIG. 5. The feedback link may be different than the serving link. The feedback link may be relayed from the receiver to the transmitter via another node. The feedback link may comprise both a wired connection and a wireless connection.

Figure 13:
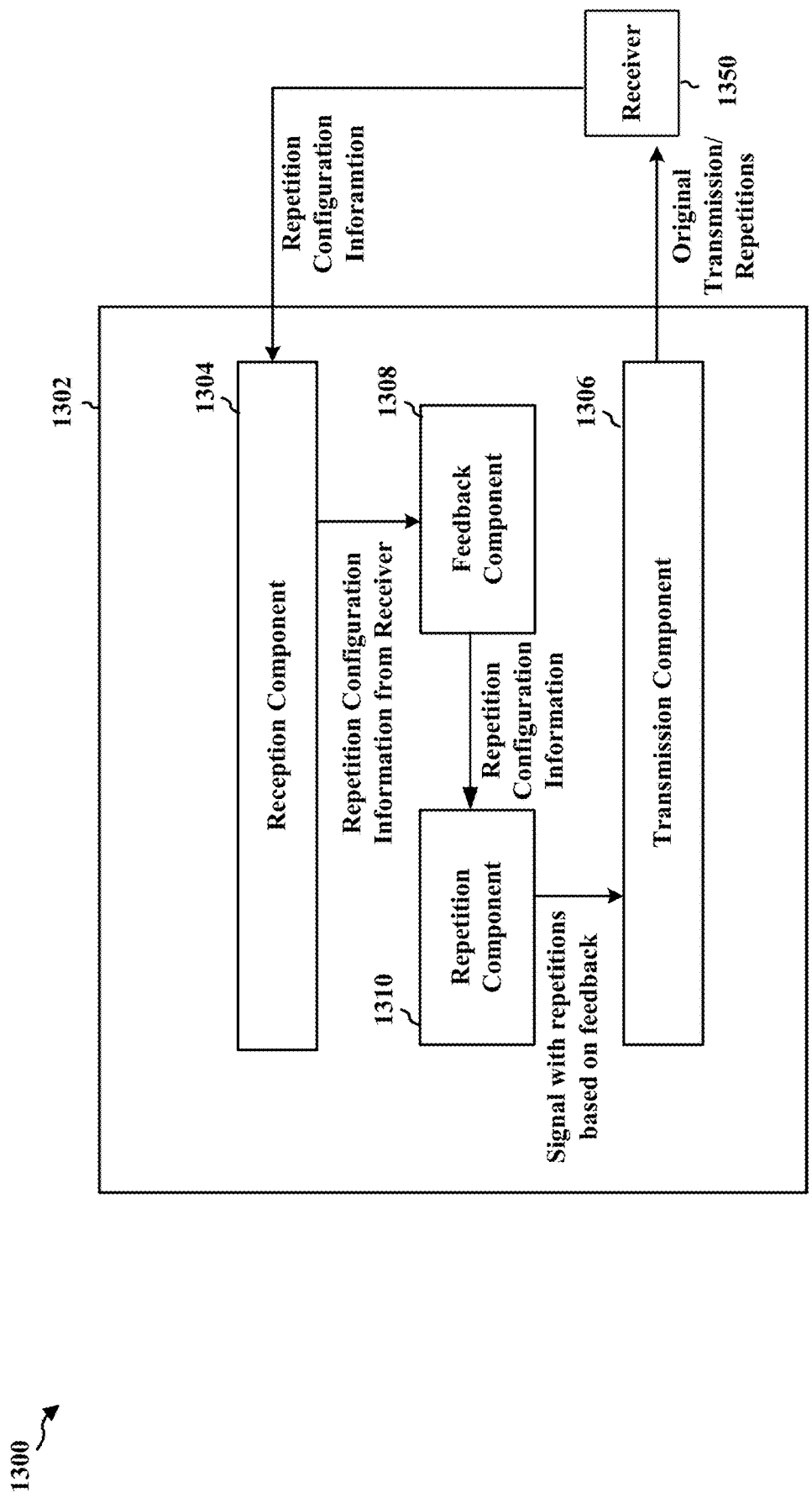
FIG. 13 is a conceptual data flow diagram illustrating the data flow between different means/components in an exemplary apparatus.

FIG. 13 is a conceptual data flow diagram 1300 illustrating the data flow between different means/components in an exemplary transmitter apparatus 1302. The apparatus is a transmitter and may be a UE or a base station (e.g., UE 104, 350, 404, 504, 602 communicating as a transmitter or base station 102, 310, 402, 502, 604 communicating as a transmitter). The apparatus includes a reception component 1304 that receives wireless communication from a receiver 1350 and a transmission component 1306. The apparatus includes a feedback component 1308 that is configured to receive repetition configuration information from the receiver 1350. The repetition configuration information may comprise, e.g., any combination of a repetition frequency hopping indicator, at least one beam index, or a repetition type, and/or whether repetition is enabled. The repetition configuration may comprise any of example information described in connection with 1102 in FIG. 11, for example. The apparatus includes a repetition component 1310 configured to transmit repetitions of a signal to the receiver based on the received repetition configuration information, e.g., as described in connection with 1102 and 1104 in FIG. 11.

The apparatus may include additional components that perform each of the blocks of the algorithm in the aforementioned flowcharts of FIGS. 6 and 11, and the aspects described in connection with FIGS. 4, 5, and 7-10. As such, each block in the aforementioned flowcharts of FIGS. 6 and 11, and the aspects described in connection with FIGS. 4, 5, and 7-10, may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 14:
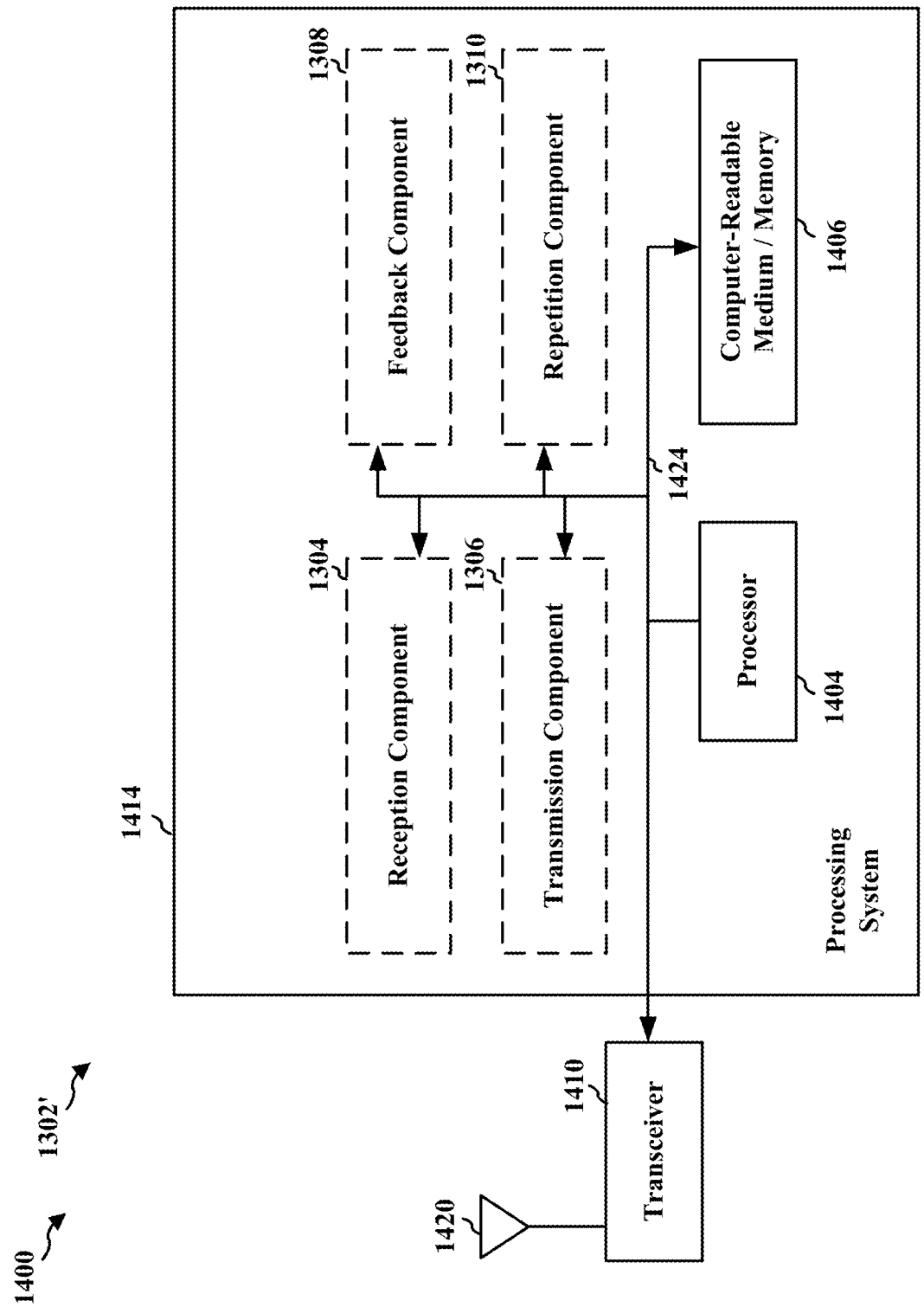
FIG. 14 is a diagram illustrating an example of a hardware implementation for an apparatus employing a processing system.

FIG. 14 is a diagram 1400 illustrating an example of a hardware implementation for an apparatus 1302' employing a processing system 1414. The processing system 1414 may be implemented with a bus architecture, represented generally by the bus 1424. The bus 1424 may include any number of interconnecting buses and bridges depending on the specific application of the processing system 1414 and the overall design constraints. The bus 1424 links together various circuits including one or more processors and/or hardware components, represented by the processor 1404, the components 1304, 1306, 1308, 1310, and the computer-readable medium/memory 1406. The bus 1424 may also link various other circuits such as timing sources, peripherals, voltage regulators, and power management circuits, which are well known in the art, and therefore, will not be described any further.

The processing system 1414 may be coupled to a transceiver 1410. The transceiver 1410 is coupled to one or more antennas 1420. The transceiver 1410 provides a means for communicating with various other apparatus over a transmission medium. The transceiver 1410 receives a signal from the one or more antennas 1420, extracts information from the received signal, and provides the extracted information to the processing system 1414, specifically the reception component 1304. In addition, the transceiver 1410 receives information from the processing system 1414, specifically the transmission component 1306, and based on the received information, generates a signal to be applied to the one or more antennas 1420. The processing system 1414 includes a processor 1404 coupled to a computer-readable medium/memory 1406. The processor 1404 is responsible for general processing, including the execution of software stored on the computer-readable medium/memory 1406. The software, when executed by the processor 1404, causes the processing system 1414 to perform the various functions described supra for any particular apparatus. The computer-readable medium/memory 1406 may also be used for storing data that is manipulated by the processor 1404 when executing software. The processing system 1414 further includes at least one of the components 1304, 1306, 1308, 1310. The components may be software components running in the processor 1404, resident/stored in the computer readable medium/memory 1406, one or more hardware components coupled to the processor 1404, or some combination thereof. When the transmitter is a base station, the processing system 1414 may be a component of the base station 310 and may include the memory 376 and/or at least one of the TX processor 316, the RX processor 370, and the controller/processor 375. When the transmitter is a UE, the processing system 1414 may be a component of the UE 350 and may include the memory 360 and/or at least one of the TX processor 368, the RX processor 356, and the controller/processor 359.

In one configuration, the apparatus 1302/1302' for wireless communication includes means for receiving repetition configuration information from a receiver (e.g., at least feedback component 1308, processor 1404, memory 1406, transceiver 1410, and/or antenna 1420), e.g., including any combination of a repetition frequency hopping indicator, at least one beam index, or a repetition type, or whether repetitions is enabled, as described in connection with 1102 and 1308. The apparatus may also include means for transmitting repetitions of a signal to the receiver based on the received repetition configuration information (e.g., at least repetition component 1310, processor 1404, memory 1406, transceiver 1410, and/or antenna 1420), e.g., as described in connection with 1104, and 1310). When the apparatus is a base station, the aforementioned means may be one or more of the aforementioned components of the apparatus 1302 and/or the processing system 1414 of the apparatus 1302' configured to perform the functions recited by the aforementioned means. As described supra, the processing system 1414 may include the antenna 1420, antenna 320, transceiver 1410, TX Processor 316, the RX Processor 370, and the controller/processor 375. As such, in one configuration, the aforementioned means may be the TX Processor 316, the RX Processor 370, antenna 1420, antenna 320, transceiver 1410, and the controller/processor 375 configured to perform the functions recited by the aforementioned means. When the apparatus is a UE, the aforementioned means may be one or more of the aforementioned components of the apparatus 1302 and/or the processing system 1414 of the apparatus 1302' configured to perform the functions recited by the aforementioned means. As described supra, the processing system 1414 may include the TX Processor 368, the RX Processor 356, antenna 1420, antenna 352, transceiver 1410, and the controller/processor 359. As such, in one configuration, the aforementioned means may be the TX Processor 368, the RX Processor 356, and the controller/processor 359 configured to perform the functions recited by the aforementioned means.

Figure 15:
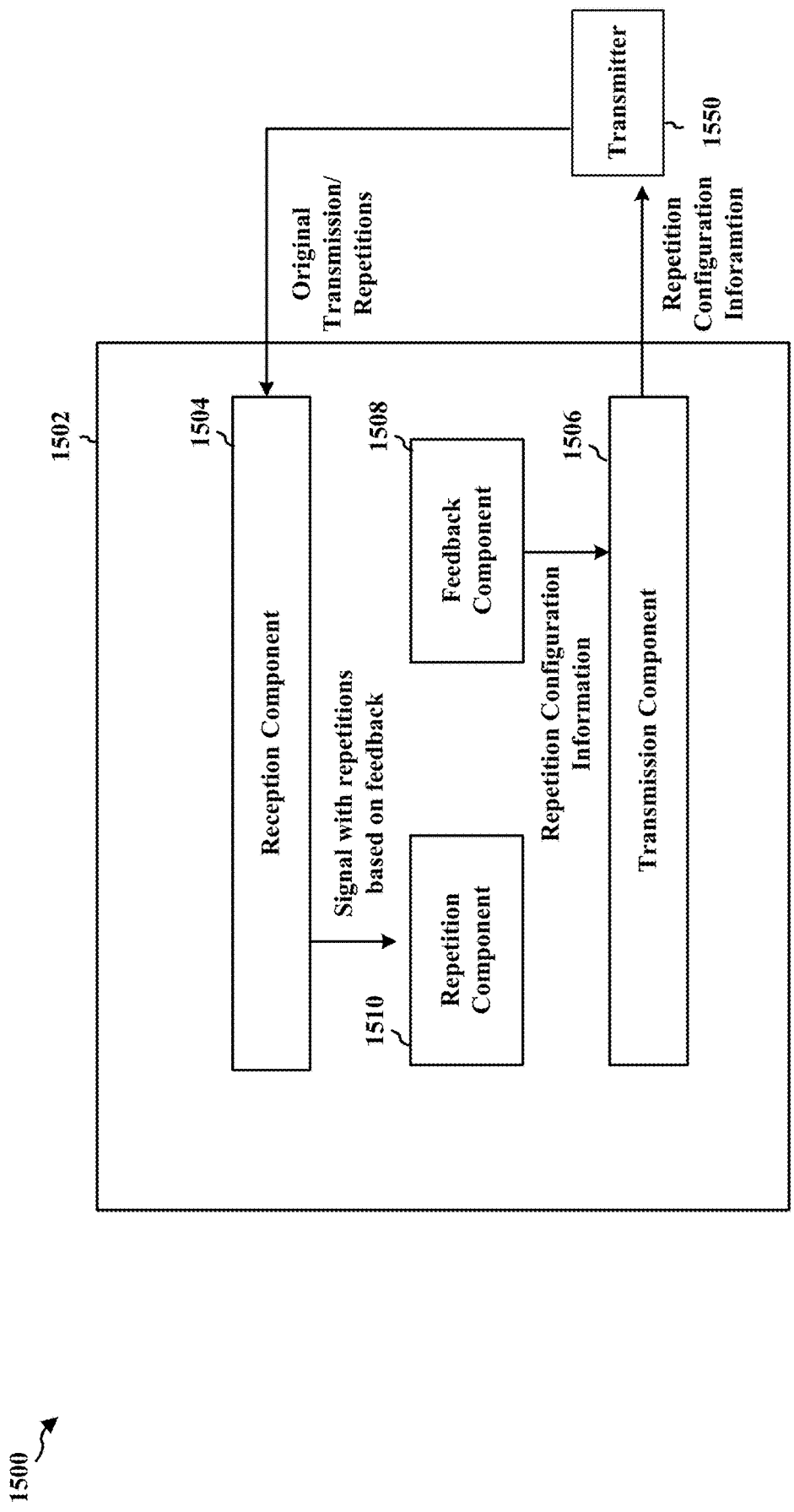
FIG. 15 is a conceptual data flow diagram illustrating the data flow between different means/components in an exemplary apparatus.

FIG. 15 is a conceptual data flow diagram 1500 illustrating the data flow between different means/components in an exemplary receiver apparatus 1502. The apparatus may be a UE or a base station (e.g., UE 104, 350, 404, 504, 602 communicating as a receiver or base station 102, 310, 402, 502, 604 communicating as a receiver). The apparatus includes a reception component 1504 that receives communication, including an original signal and repetitions of the signal from a transmitter 1550. The apparatus also includes a transmission component 1506 that transmits communication, including feedback comprising repetition configuration information, to the transmitter 1550. The apparatus includes a feedback component 1508 configured to transmit repetition configuration information from the receiver apparatus to the transmitter 1550, wherein the repetition configuration information comprises any combination of a repetition frequency hopping indicator, at least one beam index, a repetition type, a repetition number, a repetition pattern, an indication of whether repetition is enabled/disabled, whether use of the repetition configuration information is mandatory, etc., e.g., as described in connection with 1202. The apparatus includes a repetition component 1510 configured to receive repetitions of a signal to the receiver apparatus 1502 from the transmitter 1550 based on the received repetition configuration information, e.g., as described in connection with 1204.

The apparatus may include additional components that perform each of the blocks of the algorithm in the aforementioned flowcharts of FIGS. 6 and 12, and the aspects described in connection with FIGS. 4, 5, and 7-10. As such, each block in the aforementioned flowcharts of FIGS. 6 and 12, and the aspects described in connection with FIGS. 4, 5, and 7-10, may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 16:
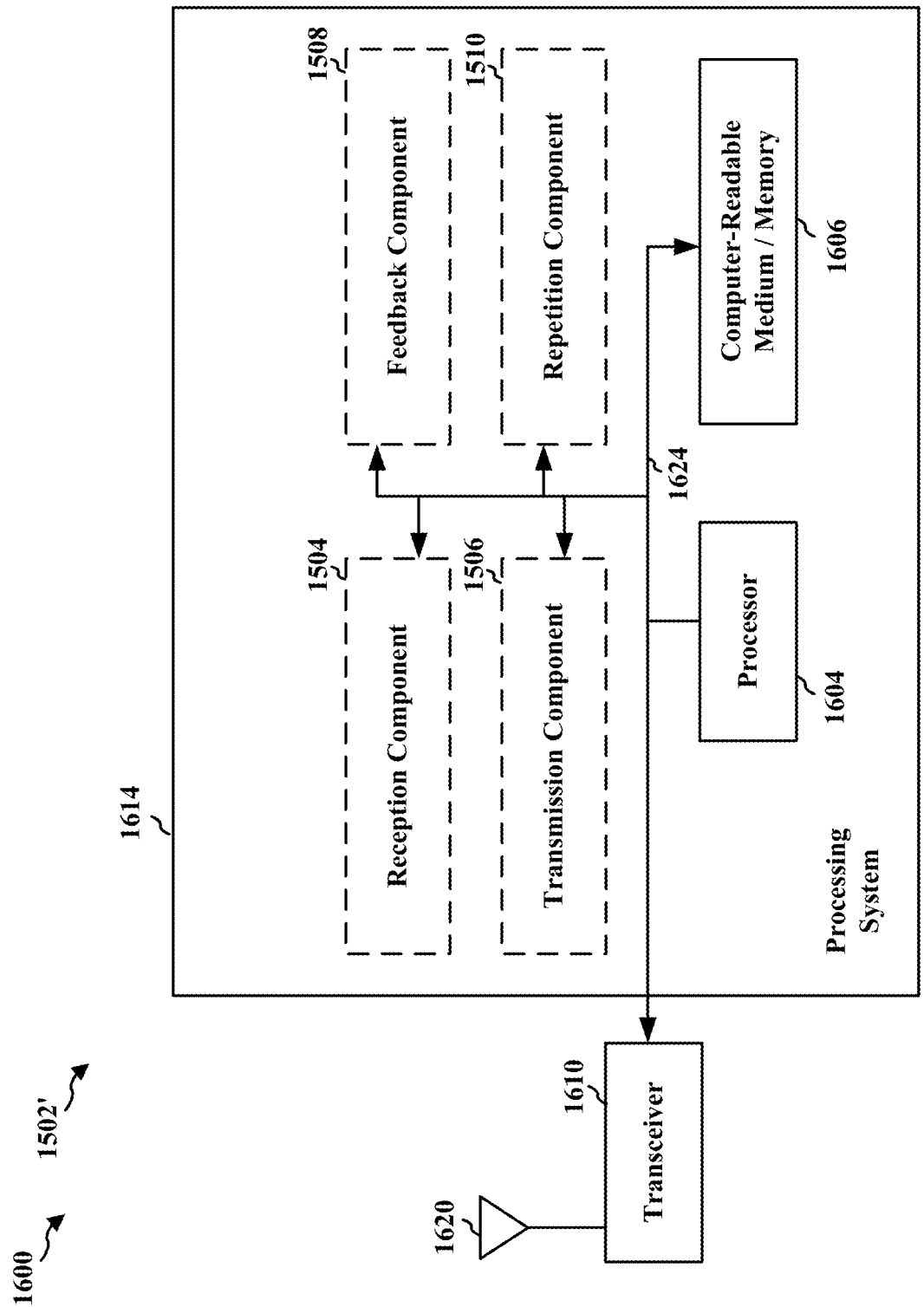
FIG. 16 is a diagram illustrating an example of a hardware implementation for an apparatus employing a processing system.

FIG. 16 is a diagram 1600 illustrating an example of a hardware implementation for an apparatus 1502' employing a processing system 1614. The processing system 1614 may be implemented with a bus architecture, represented generally by the bus 1624. The bus 1624 may include any number of interconnecting buses and bridges depending on the specific application of the processing system 1614 and the overall design constraints. The bus 1624 links together various circuits including one or more processors and/or hardware components, represented by the processor 1604, the components 1504, 1506, 1508, 1510, and the computer-readable medium/memory 1606. The bus 1624 may also link various other circuits such as timing sources, peripherals, voltage regulators, and power management circuits, which are well known in the art, and therefore, will not be described any further.

The processing system 1614 may be coupled to a transceiver 1610. The transceiver 1610 is coupled to one or more antennas 1620. The transceiver 1610 provides a means for communicating with various other apparatus over a transmission medium. The transceiver 1610 receives a signal from the one or more antennas 1620, extracts information from the received signal, and provides the extracted information to the processing system 1614, specifically the reception component 1504. In addition, the transceiver 1610 receives information from the processing system 1614, specifically the transmission component 1506, and based on the received information, generates a signal to be applied to the one or more antennas 1620. The processing system 1614 includes a processor 1604 coupled to a computer-readable medium/memory 1606. The processor 1604 is responsible for general processing, including the execution of software stored on the computer-readable medium/memory 1606. The software, when executed by the processor 1604, causes the processing system 1614 to perform the various functions described supra for any particular apparatus. The computer-readable medium/memory 1606 may also be used for storing data that is manipulated by the processor 1604 when executing software. The processing system 1614 further includes at least one of the components 1504, 1506, 1508, 1510. The components may be software components running in the processor 1604, resident/stored in the computer readable medium/memory 1606, one or more hardware components coupled to the processor 1604, or some combination thereof. When the receiver is a base station, the processing system 1614 may be a component of the base station 310 and may include the memory 376 and/or at least one of the TX processor 316, the RX processor 370, and the controller/processor 375. When the receiver is a UE, the processing system 1614 may be a component of the UE 350 and may include the memory 360 and/or at least one of the TX processor 368, the RX processor 356, and the controller/processor 359.

In one configuration, the apparatus 1502/1502' for wireless communication includes means for transmitting repetition configuration information from a receiver (e.g., at least feedback component 1508, processor 1604, memory 1606, transceiver 1610, and/or antenna 1620), wherein the repetition configuration information comprises any combination of a repetition frequency hopping indicator, at least one beam index, a repetition type, a repetition number, a repetition pattern, an indication of whether repetition is enabled/disabled, whether use of the repetition configuration information is mandatory, etc., e.g., as described in connection with 1202. The apparatus may include means for receiving repetitions of a signal to the receiver based on the received repetition configuration information (e.g., at least repetition component 1510, processor 1604, memory 1606, transceiver 1610, and/or antenna 1620), e.g., as described in connection with 1204. When the receiver is a base station, the aforementioned means may be one or more of the aforementioned components of the apparatus 1502 and/or the processing system 1614 of the apparatus 1502' configured to perform the functions recited by the aforementioned means. As described supra, the processing system 1614 may include the TX Processor 316, the RX Processor 370, and the controller/processor 375. As such, in one configuration, the aforementioned means may be the TX Processor 316, the RX Processor 370, antenna 1620, antenna 320, transceiver 1610, and the controller/processor 375 configured to perform the functions recited by the aforementioned means. When the receiver is a UE, the aforementioned means may be one or more of the aforementioned components of the apparatus 1502 and/or the processing system 1614 of the apparatus 1502' configured to perform the functions recited by the aforementioned means. As described supra, the processing system 1614 may include the TX Processor 368, the RX Processor 356, antenna 1620, antenna 352, transceiver 1610, and the controller/processor 359. As such, in one configuration, the aforementioned means may be the TX Processor 368, the RX Processor 356, and the controller/processor 359 configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication at a base station, comprising:
    receiving, from a user equipment (UE), repetition configuration information that comprises an indication of a beam sweep repetition type for beam sweep repetitions of one or more of a control channel or a shared channel; and
    transmitting, via a beam sweep, repetitions of a signal to the UE based on the beam sweep repetition type indicated in the repetition configuration information received from the UE.

2. The method of claim 1, wherein the repetition configuration information corresponds to a particular signal channel.

3. The method of claim 1, wherein the repetition configuration information includes repetition configuration information for a plurality of signal channels and indicates to which of the respective plurality of signal channels corresponding repetition configuration information should be applied.

4. The method of claim 1, wherein the repetition configuration information indicates the beam sweep repetition type for the repetitions of the control channel and the shared channel.

5. The method of claim 4, wherein the beam sweep repetition type comprises an individual channel-based repetition or a beam sweep block-based repetition.

6. The method of claim 1, wherein receiving the repetition configuration information comprises receiving the repetition configuration information on a feedback link and wherein transmitting the repetitions of the signal comprises transmitting the repetitions of the signal to the UE on a serving link, wherein the feedback link is different than the serving link.

7. The method of claim 1, wherein the repetition configuration information indicates the beam sweep repetition type for repetitions of the control channel.

8. The method of claim 1, wherein the repetition configuration information indicates the beam sweep repetition type for repetitions of the shared channel.

9. A method of wireless communication at a transmitter, comprising:
    receiving, from a receiver, repetition configuration information indicating at least one beam index, the at least one beam index comprising a beam index for at least a transmission beam or a reception beam; and
    transmitting repetitions of a signal to the receiver using the transmission beam indicated in the repetition configuration information received from the receiver.

10. The method of claim 9, wherein the repetition configuration information indicates a sequence of beam indices for a sequence of transmission beams including the transmission beam, and wherein transmitting the repetitions of the signal to the receiver comprises using the sequence of transmission beams.

11. The method of claim 10, wherein the sequence of beam indices are for at least a sequence of reception beams to enable the receiver to receive the repetitions of the signal transmitted from the transmitter using the sequence of reception beams.

12. A method of wireless communication at a transmitter, comprising:
    receiving repetition configuration information from a receiver, wherein the repetition configuration information comprises an indication of at least one beam index or an indication of a beam sweep repetition type, wherein the repetition configuration information indicates whether the repetition configuration information is mandatory for the transmitter to use to transmit a signal to the receiver; and
    transmitting repetitions of the signal to the receiver based on the repetition configuration information received from the receiver.

13. An apparatus for wireless communication at a base station, comprising:
    a memory; and
    at least one processor coupled to the memory and configured to:
        receive, from a user equipment (UE), repetition configuration information that comprises an indication of a beam sweep repetition type for beam sweep repetitions of one or more of a control channel or a shared channel; and
        transmit, via a beam sweep, repetitions of a signal to the UE based on the beam sweep repetition type indicated in the repetition configuration information received from the receiver.

14. A method of wireless communication at a user equipment (UE), comprising:
    transmitting, to a base station, repetition configuration information that comprises an indication of a beam sweep repetition type for beam sweep repetitions of one or more of a control channel or a shared channel; and
    receiving, via a beam sweep, repetitions of a signal from the base station based on the beam sweep repetition type indicated in the repetition configuration information transmitted to the base station.

15. The method of claim 14, wherein the repetition configuration information corresponds to a particular signal channel.

16. The method of claim 14, wherein the repetition configuration information includes repetition configuration information for a plurality of signal channels and indicates to which of the respective plurality of signal channels corresponding repetition configuration information should be applied.

17. The method of claim 14, wherein the repetition configuration information indicates the beam sweep repetition type for repetitions of the control channel and the shared channel.

18. The method of claim 17, wherein the beam sweep repetition type indicates an individual channel-based repetition or a beam sweep block-based repetition.

19. The method of claim 14, wherein transmitting the repetition configuration information comprises transmitting the repetition configuration information on a feedback link and wherein receiving the repetitions of the signal from the base station comprises receiving the repetitions of the signal from the base station on a serving link, wherein the feedback link is different than the serving link.

20. A method of wireless communication at a receiver, comprising:
transmitting, to a transmitter, repetition configuration information indicating at least a beam index for at least a transmission beam or a reception beam; and
receiving repetitions of a signal from the transmitter using the reception beam indicated in the repetition configuration information.

21. The method of claim 20, wherein the repetition configuration information indicates a sequence of beam indices for a sequence of transmission beams including the transmission beam, and wherein receiving the repetitions of the signal from the transmitter comprises receiving the repetitions of the signal via the sequence of transmission beams.

22. The method of claim 20, wherein the repetition configuration information indicates a sequence of beam indices for a sequence of reception beams including the reception beam, and wherein receiving the repetitions of the signal from the transmitter comprises using the sequence of reception beams.

23. A method of wireless communication at a receiver, comprising:
transmitting repetition configuration information to a transmitter, wherein the repetition configuration information comprises an indication of at least one beam index or an indication of a beam sweep repetition type, wherein the repetition configuration information indicates whether the repetition configuration information is mandatory for the transmitter to use to transmit a signal to the receiver; and
receiving repetitions of the signal from the transmitter based on the repetition configuration information transmitted to the transmitter.

24. An apparatus for wireless communication at a user equipment (UE), comprising:
a memory; and
at least one processor coupled to the memory and configured to:
transmit, to a base station, repetition configuration information that comprises an indication of a beam sweep repetition type for beam sweep repetitions of one or more of a control channel or a shared channel; and
receive, via a beam sweep, repetitions of a signal from the base station based on the beam sweep repetition type indicated in the repetition configuration information transmitted to the base station.

25. An apparatus for wireless communication at a receiver, comprising:
a memory; and
at least one processor coupled to the memory and configured to:
transmit, to a transmitter, repetition configuration information that comprises an indication of at least one beam index, the at least one beam index comprising a beam index for at least a transmission beam or a reception beam; and
receive repetitions of a signal from the transmitter using the reception beam indicated in the repetition configuration information.

26. The apparatus of claim 25, wherein the repetition configuration information indicates a sequence of beam indices for a sequence of transmission beams including the transmission beam, and wherein transmitting the repetitions of the signal to the receiver comprises using the sequence of transmission beams.

27. An apparatus for wireless communication at a receiver, comprising:
a memory; and
at least one processor coupled to the memory and configured to:
transmit repetition configuration information to a transmitter, wherein the repetition configuration information comprises an indication of at least one beam index or an indication of a beam sweep repetition type, wherein the repetition configuration information indicates whether the repetition configuration information is mandatory for the transmitter to use to transmit a signal to the receiver; and
receive repetitions of the signal from the transmitter based on the repetition configuration information transmitted to the transmitter.

28. An apparatus for wireless communication at a transmitter, comprising:
a memory; and
at least one processor coupled to the memory and configured to:
receive, from a receiver, repetition configuration information indicating at least one beam index, the at least one beam index comprising a beam index for at least a transmission beam or a reception beam; and
transmit repetitions of a signal to the receiver using the transmission beam indicated in the repetition configuration information received from the receiver.

29. The apparatus of claim 28, wherein the repetition configuration information indicates a sequence of beam indices for a sequence of transmission beams including the transmission beam, and wherein transmitting the repetitions of the signal to the receiver comprises using the sequence of transmission beams.

30. An apparatus for wireless communication at a transmitter, comprising:
a memory; and
at least one processor coupled to the memory and configured to:
receive repetition configuration information from a receiver, wherein the repetition configuration information comprises an indication of at least one beam index or an indication of a beam sweep repetition type, wherein the repetition configuration information indicates whether the repetition configuration information is mandatory for the transmitter to use to transmit a signal to the receiver; and transmit repetitions of the signal to the receiver based on the repetition configuration information received from the receiver.

* * * * *